C. W. HOTTMANN.
CUTTING MACHINE.
APPLICATION FILED NOV. 7, 1916.
1,237,907.
Patented Aug. 21, 1917.
4 SHEETS—SHEET 1.
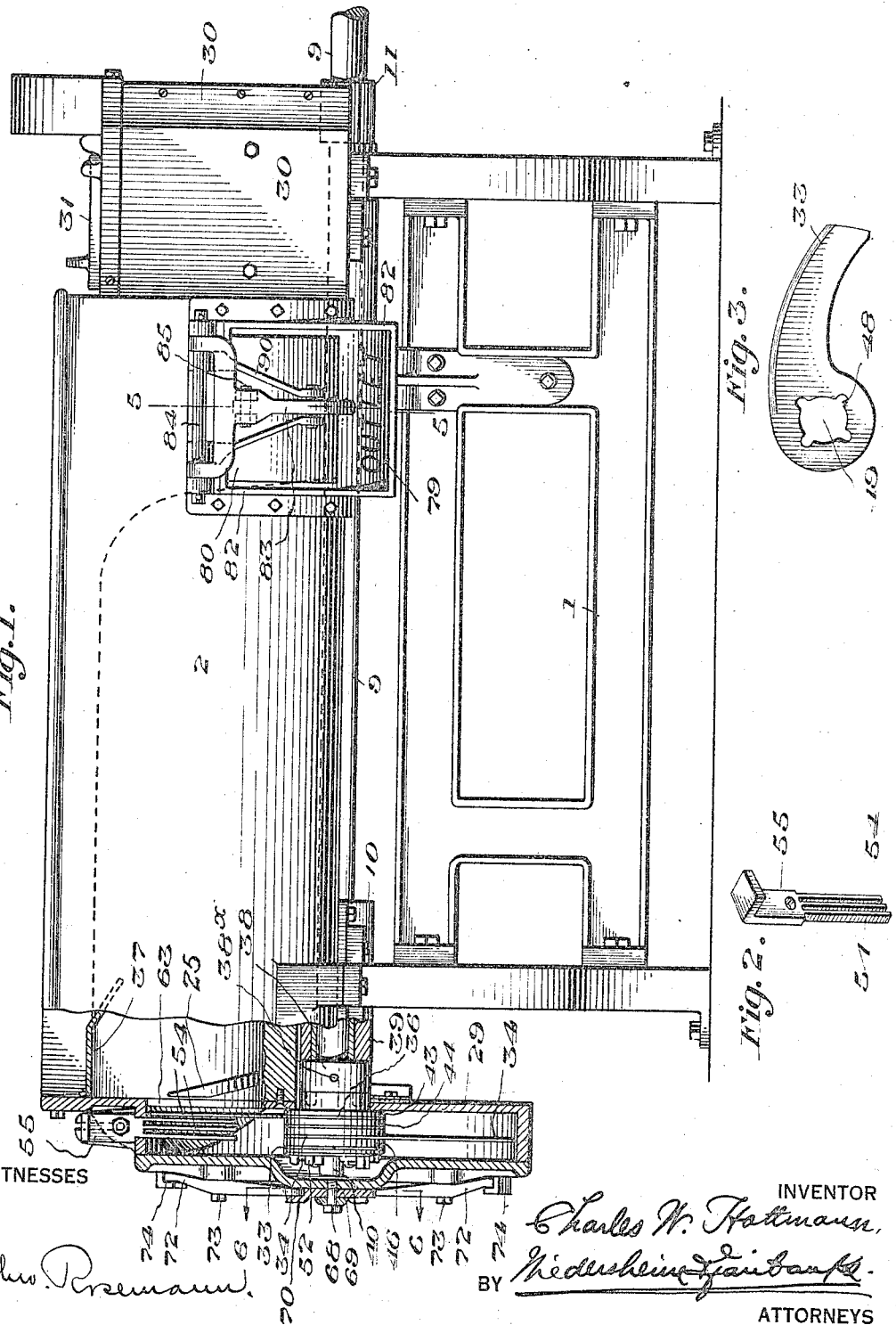

C. W. HOTTMANN.
CUTTING MACHINE.
APPLICATION FILED NOV. 7, 1916.
1,237,907.
Patented Aug. 21, 1917.
4 SHEETS—SHEET 2.
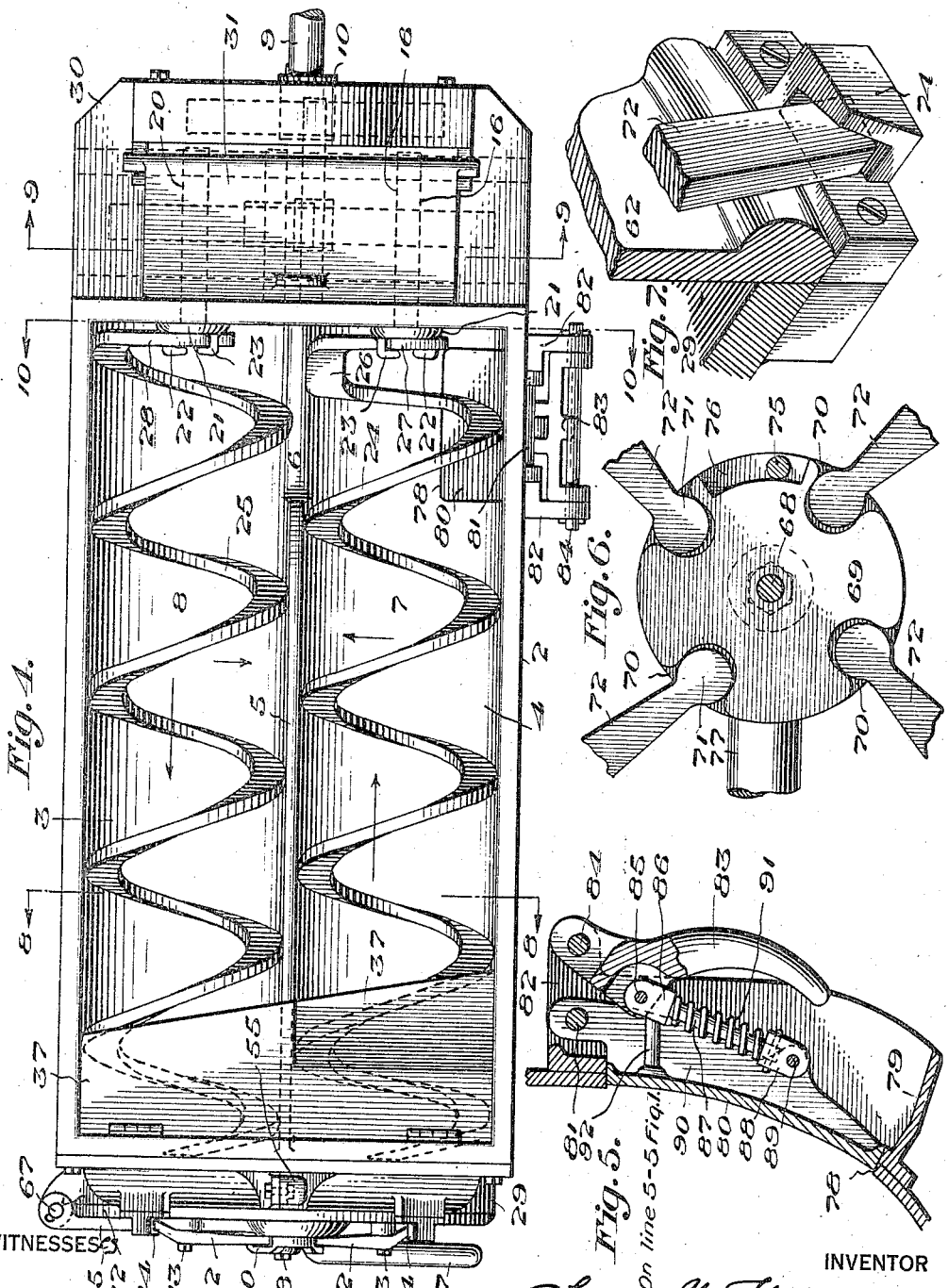
WITNESSES
INVENTOR
Charles W. Hottmann
BY
ATTORNEYS

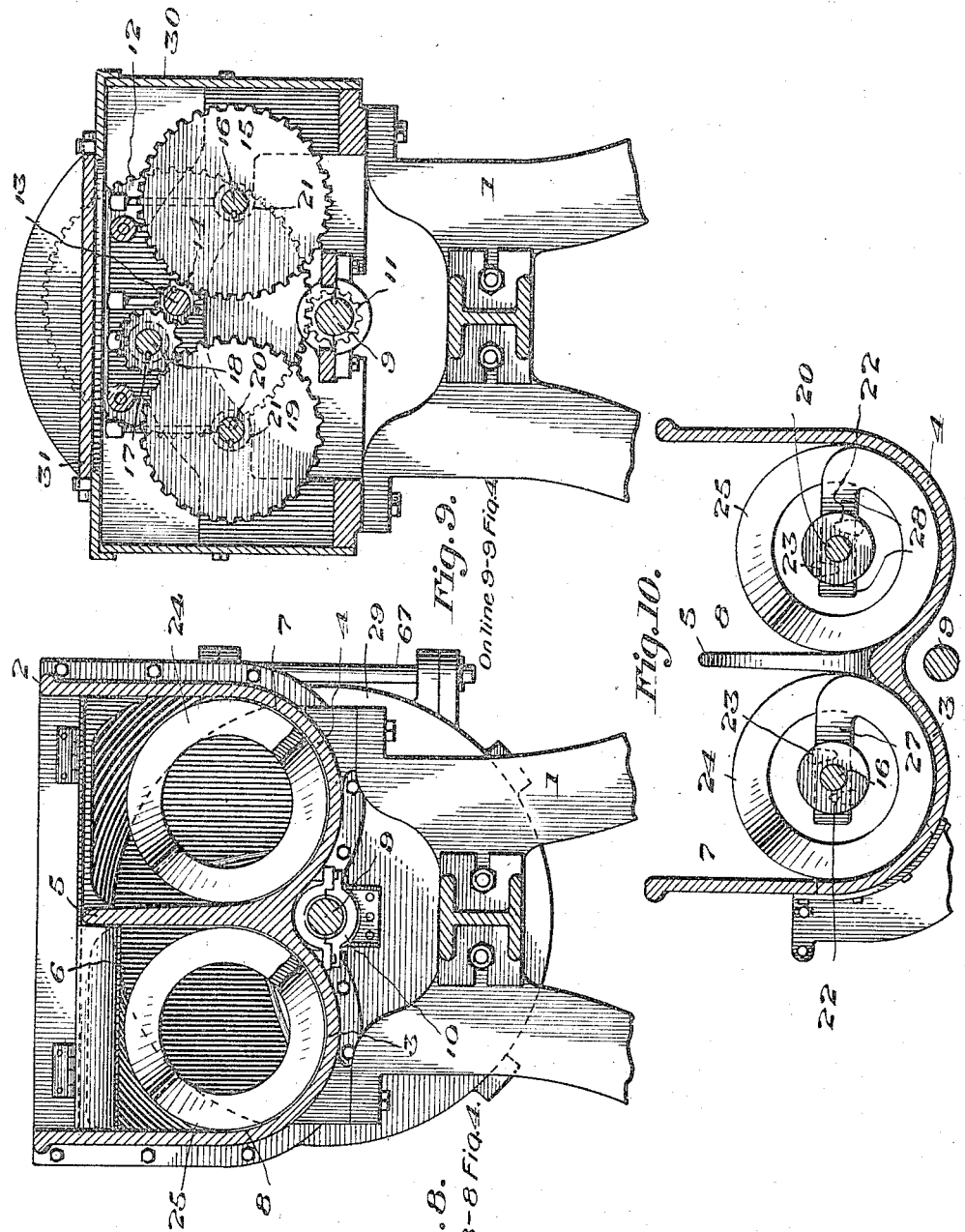

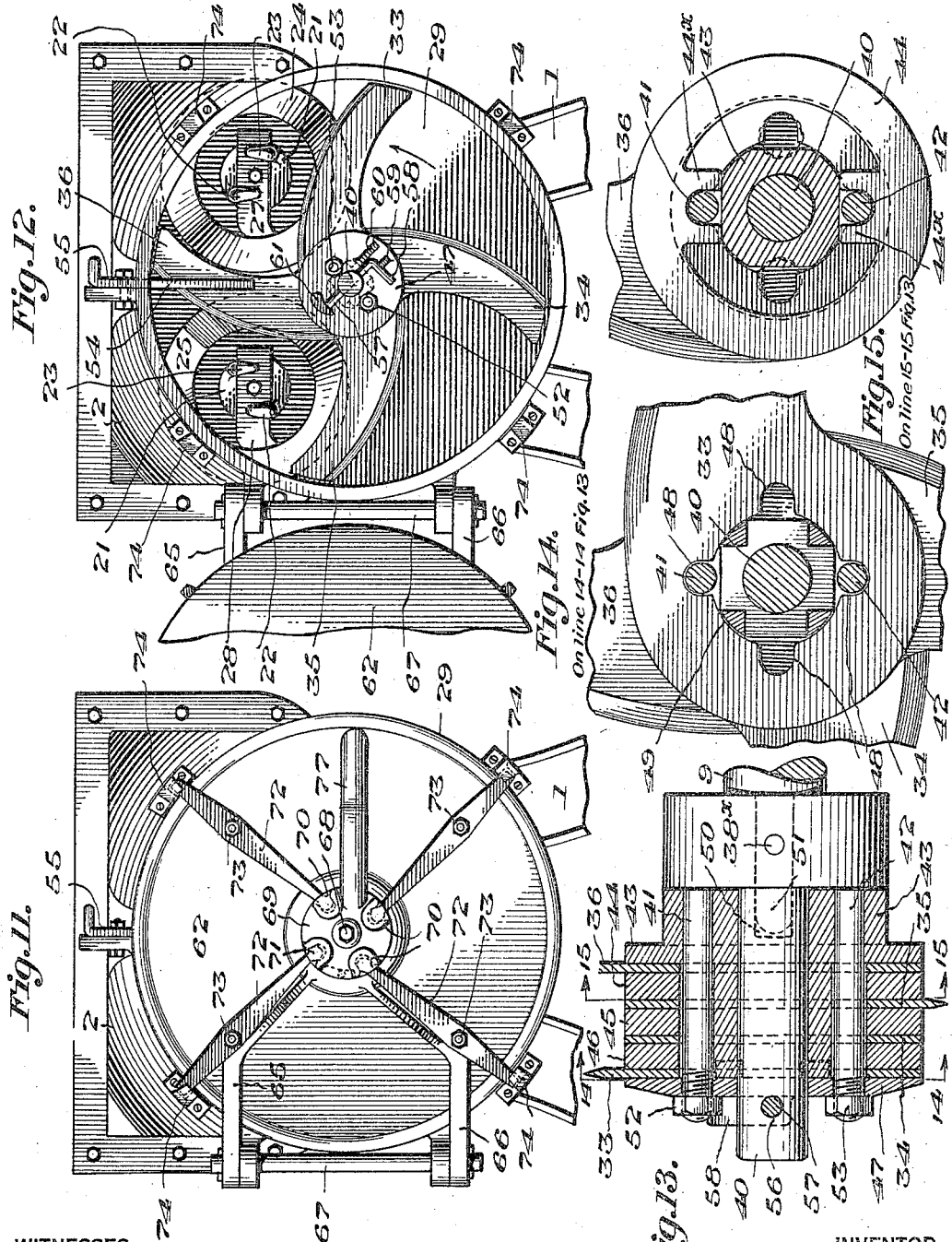

UNITED STATES PATENT OFFICE.

CHARLES W. HOTTMANN, OF PHILADELPHIA, PENNSYLVANIA.

CUTTING-MACHINE.

1,237,907.  Specification of Letters Patent.  Patented Aug. 21, 1917.

Application filed November 7, 1916. Serial No. 130,098.

*To all whom it may concern:*

Be it known that I, CHARLES W. HOTTMANN, a citizen of the United States, residing in the city and county of Philadelphia, State of Pennsylvania, have invented a new and useful Cutting-Machine, of which the following is a specification.

In cutting machines as heretofore constructed considerable difficulty has arisen in maintaining the machine in a sanitary condition and in constructing it in such a manner that different parts, such for example as the feeding mechanism and the cutting mechanism, may be readily and quickly removed without necessitating the dismantling of the entire machine.

In my prior Patent #1,017,213, dated February 13th, 1912, I have described and broadly claimed a novel construction of a cutting machine wherein the material which is being cut is continuously fed to and from the cutting mechanism until it has been reduced to a desired degree of fineness and in my present invention the cycle of the operation is somewhat similar to that of my prior patent but includes a novel construction and arrangement of the parts whereby improved results are obtained.

With the above in view my invention consists of a novel construction of a cutting machine wherein novel means are employed to effect the feed of the material and wherein a novel construction and arrangement of cutting mechanism is employed.

It further consists of a novel construction and arrangement of a discharge outlet and means to control such outlet.

It further consists of a novel construction of a casing adapted to receive material-feeding and cutting mechanism and novel means for rendering the cutting mechanism accessible when it is desired to remove or change the cutting mechanism.

It further consists of a novel construction of cutters and novel means for securing them in position.

It further consists of novel driving mechanism which is constructed in such a manner that the feed conveyers are actuated at the proper speed with respect to the rotating cutters.

Other numerous novel features of construction and advantage will hereinafter appear in the detailed description of the invention.

For the purpose of illustrating my invention I have shown in the accompanying drawings a typical embodiment of it which is at present preferred by me since it has been found in practice to give satisfactory and reliable results. It is, however, to be understood that this embodiment is typical only and that the various instrumentalities of which my invention consists can be variously arranged and organized and that my invention is not limited to the precise arrangement and organization of these instrumentalities as herein set forth.

Figure 1 represents in side elevation and partly in section a cutting machine embodying my invention.

Fig. 2 represents in perspective and in detached position a comb or stripper seen in Fig. 1.

Fig. 3 represents a side elevation of one of the cutter blades in detached position.

Fig. 4 represents a top plan view of my machine.

Fig. 5 represents a section on line 5—5 of Fig. 1.

Fig. 6 represents a section on line 6—6 of Fig. 1.

Fig. 7 represents a fragmentary section on an enlarged scale showing more clearly certain parts of the door locking mechanism employed, and as seen also in Fig. 11.

Fig. 8 represents a section on line 8—8 of Fig. 4.

Fig. 9 represents a section on line 9—9 of Fig. 4.

Fig. 10 represents a section on line 10—10 of Fig. 4.

Fig. 11 represents an end elevation of a portion of the machine.

Fig. 12 represents an end elevation of a portion of the machine showing a portion of a door in open position to more clearly illustrate certain parts of the cutting mechanism.

Fig. 13 represents a vertical section showing certain parts of the cutting mechanism on an enlarged scale.

Fig. 14 represents a section on line 14—14 of Fig. 13.

Fig. 15 represents a section on line 15—15 of Fig. 13.

Similar numerals of reference indicate corresponding parts in the figures.

Referring to the drawings, 1 designates the base frame-work of the machine which supports a casing 2 preferably constructed of sheet metal although it may be a casting. This casing embodies two parallel feed channels or chambers 7 and 8, each as to its bottom portion semi-cylindrical, and both divided by a central upwardly-extending rib or web 5 which as shown in Figs. 8 and 10 is almost as high as the outer side walls of the casing. The casing may if desired be inclosed by a lid. In the construction represented it is open-topped.

9 designates a main driving shaft which is driven by means of any desired source of power and is journaled in brackets 10 at the ends of the frame-work. 11 is a pinion fixed upon the outer end of the shaft 9 which meshes with a gear 12 fixed upon a stud shaft 13 mounted within the gear casing 30. A pinion 14 meshes with a gear 15 fixed upon a suitably mounted side shaft 16, and meshes also with an idle pinion 17 fixed on a shaft 18 which parallels the stud shaft 13 and is housed within the gear casing. The idle pinion 17 meshes with a gear 19 fixed upon a side shaft 20 which parallels the side shaft 16.

The shafts 16 and 20 respectively extend into the feed channels 7 and 8 and at their inner ends are each provided with a boss 21 from which respectively project the oppositely extended hooks 22 and 23 which are convenient means for detachably connecting with their respective shafts 16 and 20 the inturned ends 27 and 28 of the spiral conveying blades 24 and 25. The opposite ends of the feed conveyers bear without direct connection against the outer ends of the channels within which they operate. The feed conveyer 24 is constructed and driven in such a manner that it causes the feed of the material toward the rear end of the machine or in the direction of the arrow seen in the feed channel 7 in Fig. 4. The feed conveyer 25, upon the other hand, is located in the feed channel 8, and constructed and arranged in such a manner to effect the feed of the material toward the forward end of the machine in the direction of the arrow shown in feed channel 8.

The feed conveyer 24 consists of a preferably flat strip of material of spiral or helical formation, having a relatively flattened portion at its rear end, as indicated at 26, and provided with an inturned end 27 which is adapted to interlock between the hooks 22 and 23 on the boss of the shaft 16. The feeding and conveying blade 25 is constructed in a manner similar to conveyer 24 except that the flattened portion 26 is omitted. Its inturned end 28 interlocks between the hooks 22 and 23 on the shaft 20.

The channels 7 and 8 are inclosed at their rear ends and at their forward ends communicate through an aperture 63 with the cutting chamber 29.

The gearing which operates the shafts of the conveying blades and which is operated from the driving shaft 9 is incased in any preferred form of gear casing 30, the lid 31 of which permits of access to the gears. This gear casing forms an inclosure for the rear end of the channels 7 and 8 of the conveyer blades.

At their forward ends the feed channels 7 and 8, communicate with a cutting chamber 29 of any preferred form, within which the cutting blades 33, 34, 35 and 36 are contained and operate. At its outer end the casing 2 has formed or applied within it, preferably hingedly as shown, a guide plate 37, which extends completely across it and serves to direct the material to be operated upon into and out of the cutting chamber.

In the construction represented, I have illustrated a group of four cutting blades each of the character shown in Fig. 3, preferably all alike and curved or scimitar-shaped as to their cutting edges. This group or plurality of cutting blades is connected with the front end of the main driving shaft 9 preferably by the following means:—

A boss or head 38 is removably connected by a pin 38$^\times$ with the main drive shaft 9, preferably beyond a bearing 39 in the front end of the frame work of the machine. From the front face of this head protrudes forwardly what I term a boss pin 40 and a pair of blade-retaining pins 41 and 42 all of which pass completely through a spacing collar 43, Fig. 13, and through a plurality of spacing rings 44, 45, 46 respectively formed with lugs 44$^\times$, Fig. 15, and through a retaining cap 47,—and the pins also pass through notches 48 within the periphery of an aperture 49 in the cutting blades, as shown in Fig. 3.

The boss pin 40 is bored at 50 to fit over a centering knob 51 on the shaft 9, as shown in Fig. 13. The front ends of the retaining pins are threaded, and nuts 52 and 53 upon them serve to compress the retaining cap 47, the assembled blades 33 to 36, the assembled spacing rings 44 to 46, and the spacing collar 43, all against the boss 38, to form a compact multiple-bladed cutting mechanism adapted to be rotated within the cutting chamber by the main driving shaft, and to effect the thorough and effectual cutting of the meat or other material to be acted upon, by the passage of the blades in rotating between the teeth 54 of a comb or stripper 55, Fig. 2, secured in the upper portion of the cutting chamber 29 within the range of travel of the blades.

As an additional device for retaining the cutting blades in their assembled position, I diametrically bore the outer end of the boss pin 40 at 56,—and pass through the bore a locking pin 57, Figs. 12 and 13, which has a handle head 58, by which it may be turned within its bore, preferably with respect to stops 59, 60 and 61, on the retaining cap 47. This entire device is merely a key to effectually retain the blades in position.

It will be apparent that this bladed cutting mechanism as well as the stripper can easily be removed from the cutting chamber for cleansing or adjustment by taking out the connecting pin 38$^x$, which, as shown in Fig. 1, connects the head 38 with the shaft 9, and which can be reached from the exterior of the framework of the machine.

The cutting chamber 29 at its front end is inclosed by a door 62 and at its rear end is in communication with both of the mixing channels 7 and 8 of the casing through an aperture 63, as shown in Fig. 1. The door 62 is swung upon hinge arms 65, 66 mounted upon a hinge pin 67 at the rear of the casing and side of the cutting chamber.

Protruding centrally from and affixed to a bulge in the front face of this door is a pivot pin 68 upon which is mounted a rotatable lever-locking disk 69, which in the construction shown is formed with a plurality of diametrically-opposite, outwardly-opening sockets 70, Fig. 6, within which are entered the rounded inner ends 71 of a group of locking levers 72 fulcrumed at 73 against the outer face of the door. At its outer end each of these locking levers is adapted to enter within an internally-tapering seat 74 attached to the frame-work of the machine just exteriorly of the outer periphery of the door which in the construction shown is circular.

Radially projecting from the rotatable disk 69 the rotary movement of which is limited by a stop pin 75 on the door which protrudes within a segmental slot 76 on the disk, is a handle 77 by means of which such rotation of the disk may be imparted to it as will occasion the simultaneous throw of the group of levers to cause them to be entered within or moved out of the tapering seats 74, with the result of tightly locking or unlocking the door.

Near the inner end of the casing, and in the construction shown formed through the outer curved wall of the returning feed channel 7, is a discharge opening or outlet 78, Figs. 1, 4 and 5, from which extends a discharge spout 79, Fig. 5.

80 designates a swinging door hingedly supported above the discharge opening 78, exteriorly of the casing, on a swing pin 81 preferably mounted between the side walls 82 of the discharge spout 79. Normally this door is retained in its closed position shown in Fig. 5, by a spring-controlled knuckle-joint-connection composed of a lifting handle 83 pivoted at 84 conveniently between the side walls 82 of the spout 79, and which is connected by the connecting pin 85 to a socket 86 within which is entered the outer end of a rod 87 which at its lower end is connected with a pivot head 88 the pivot of which 89 is conveniently connected with the side walls 90 of the door 80.

91 is a spiral spring encircling the rod 87 between the socket 86 and the pivot head 88, and compressed when the door is closed.

92 is a link between the pivot socket 86 and the door 80, which connects the door to the handle in such manner that in the outward pull of the handle the door will be swung outward.

The foregoing contrivance, as will be readily understood, serves, when the handle is pulled outwardly and the spring released, to permit of the swinging or opening of the door, and, when the handle is moved inwardly and the spring compressed, serves to insure the retention of the door in closed position.

The disposition or location of the discharge opening and spout at the rear of the casing and return feed channel makes it possible,—after the machine has been operated for a period long enough to insure the complete mixing and cutting of the material to be operated upon,—to effect the complete expulsion of such material while the machine is still operating. This is most important and a result that has heretofore not been accomplished in machines of this general character.

From the foregoing description, the operation of the machine will have been understood.

In addition to the fact that the location of the discharge opening at the rear end of the feed channel 7 through which the material moves backward in the direction of the arrow upon said channel in Fig. 4, makes it possible to thoroughly expel the mixed material without stopping the machine, it is of importance that the opening 6 between the feed channels should be located at the front end of the machine or at that end which is distant from the cutting mechanism and near to the discharge opening.

It will now be apparent that I have devised a novel and useful construction of a cutting machine which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A cutting machine, which comprises in combination:—a casing formed with two parallel feed channels communicating with each other,—a hollow spiral conveying blade in each of said channels,—mechanism for imparting reverse rotation to said conveying blades,—a cutting chamber into which the feed channels open,—and rotary cutting blades within said cutting chamber.

2. A cutting machine, which comprises in combination:—a casing formed with two parallel feed channels the bottoms of which are cylindric and which communicate with each other at one end,—a hollow spirally formed conveying blade in each of said channels, which conforms to the cylindric bottom of the channel,—mechanism for imparting reverse rotation within the channels to said conveying blades,—a cutting chamber at one end of said channels into which they both open,—rotary cutting blades within said cutting chamber,—and a stripper within said chamber with which said blades coöperate.

3. A cutting machine, which comprises in combination:—a casing formed with two parallel feed channels communicating with each other and one of which is formed with a discharge opening,—a hollow spirally formed conveying blade in each of said channels,—mechanism for imparting reverse rotation to said conveying blades,—a cutting chamber into which said channels open,—and rotary cutting blades within said cutting chamber.

4. A cutting machine, which comprises in combination:—a casing formed with two parallel feed channels the bottoms of which are cylindric and which communicate with each other,—a continuously spiral hollow conveying blade in one of said channels,—a spirally formed hollow conveying blade having a flattened portion at its discharging end in the other of said channels,—mechanism for imparting reverse rotation to both blades within their respective channels,—a cutting chamber at one end of said channels into which they both open,—rotary cutting blades within said cutting chamber,—and a stripper within said chamber with which said blades coöperate.

5. A cutting machine, which comprises in combination:—a casing formed with two parallel feed channels communicating with each other,—a hollow spiral conveying blade in each of said channels,—mechanism for imparting reverse rotation to said conveying blades,—a cutting chamber into which said channels open,—cutting mechanism composed of a plurality of rotatable, radially-disposed, separated cutting blades within said cutting chamber,—a stripper within said chamber with the teeth of which the blades coöperate, and means for occasioning the rotation of said cutting blades.

6. A cutting machine, which comprises in combination:—a casing formed with two parallel feed channels communicating with each other,—a hollow spiral conveying blade in each of said channels,—mechanism for imparting reverse rotation to said conveying blades,—a cutting chamber into which said channels open,—a door for inclosing the exterior of said cutting chamber having means for locking it into and unlocking it from closed position,—rotary cutting blades within said cutting chamber,—and a stripper within said chamber with which said blades coöperate.

7. A cutting machine, which comprises in combination:—a casing formed with two parallel feed channels, the bottoms of which are cylindric and which communicate with each other at one end,—a spirally formed hollow conveying blade in each of said channels which conforms to the cylindric bottom of its channels,—mechanism for imparting reverse rotation within the channels to said conveying blades,—a cutting chamber at one end of said channels into which they both open, a door for closing the exterior of said cutting chamber having means for locking it into and unlocking it from closed position,—rotary cutting blades within said cutting chamber,—and a stripper within said chamber with which said blades coöperate.

8. A cutting machine in which are combined:—a casing formed with two parallel feed channels which communicate with each other,—a hollow spiral conveying blade within each of said channels, having an inturned inner end,—a driven stud shaft with which the inturned end of said blade is detachably connected,—mechanism for imparting rotation to said stud shaft,—a cutting chamber into which said channels open,—a toothed stripper,—rotary cutting blades within said cutting chamber,—and means for occasioning the rotation of said cutting blades.

9. A cutting machine in which are combined:—a casing formed with two parallel feed channels the bottoms of which are semi-cylindric which communicate with each other and one of which is provided with a discharge opening adapted to be opened and closed,—a hollow spiral conveying blade within each of said channels,—mechanism for imparting reverse rotation to said conveying blades,—a cutting chamber into which said channels open,—and rotary cutting blades within said cutting chamber.

10. In a machine of the class recited, in combination with a channeled casing having within it feeding blades and opening into a cutting chamber,—and with a cutting chamber,—a cutting mechanism within said cutting chamber, which comprises a driving shaft, a plurality of cutting blades centrally apertured and the apertures formed with notches mounted upon said shaft, spacing devices between said blades, a pin-provided boss or head detachably connected with the driving shaft and the pins of which pass through notches in the cutting blades,—and means for detachably locking said blades and spacing devices relatively to said boss upon the driving shaft.

11. A cutting machine in which are combined:—a casing formed with two parallel feed channels the bottoms of which are semi-cylindric and which are divided by a web a part of which is cut away so as to afford communication between the two channels,—a discharge opening out of one of said feed channels,—a door for closing said discharge opening having means for locking it into and unlocking it from closed position,—a hollow spiral conveying blade within each of said channels,—mechanism for imparting reverse rotation to said conveying blades,—a cutting chamber into which said channels open,—and rotary cutting blades within said cutting chamber.

12. A casing for a cutting machine, which comprises in combination:—a plurality of parallel, longitudinally-extending feed channels the bottoms of which are semi-cylindric and which communicate with each other,— a plurality of hollow spiral conveying blades one in each of the channels,—means for rotating said spiral blades in reverse directions within said channels,—and connecting means between corresponding ends of said blades and said means for rotating them.

13. A casing for a cutting machine, which comprises in combination:—a plurality of parallel, longitudinally-extending feed channels the bottoms of which are semi-cylindric and which communicate with each other,—a plurality of hollow spiral conveying blades one in each of the channels,—means for rotating said blades in reverse directions within said channels,—connecting means between corresponding ends of said blades and said means for rotating them,—a cutting chamber into which said channels open,—cutting mechanism within said cutting chamber,— and means for occasioning the operation of said cutting mechanism.

CHARLES W. HOTTMANN.

Witnesses:
J. BONSALL TAYLOR,
C. D. McVAY.

Copies of this patent may be obtained for five cents each, by addressing the "Commissioner of Patents, Washington, D. C."